No. 11,935. Reissued Oct. 8, 1901.
A. W. MACONOCHIE.
TIN FOR INCLOSING PRESERVED PROVISIONS OR FOODS OR THE LIKE.
(Application filed July 23, 1901.)
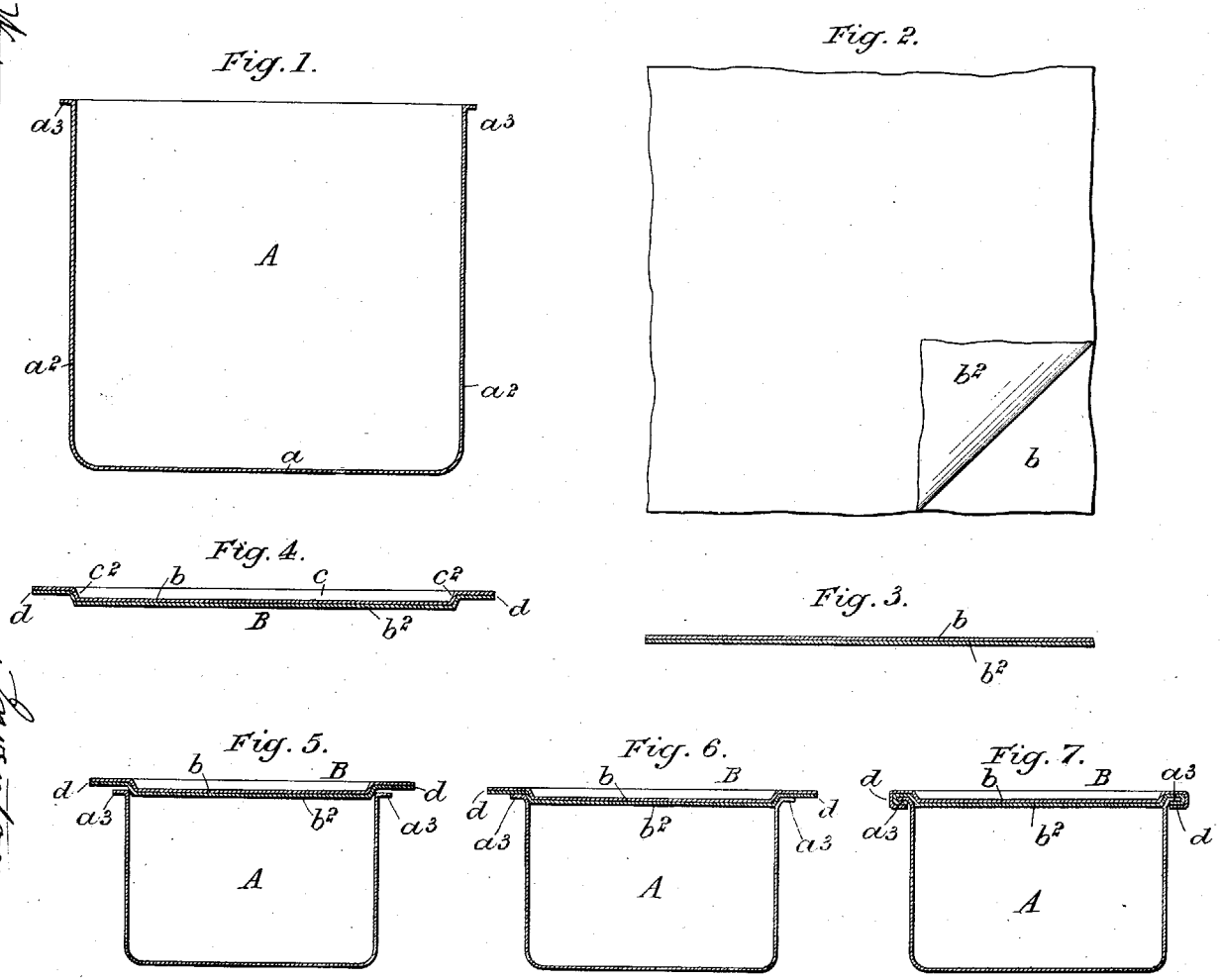
Witnesses:-
H. E. Burns
J. T. Cameron
Inventor:-
Archibald White Maconochie
by Philip Mauro
his Atty

UNITED STATES PATENT OFFICE.

ARCHIBALD WHITE MACONOCHIE, OF LONDON, ENGLAND, ASSIGNOR TO THE MACONOCHIE BROTHERS, OF SAME PLACE.

TIN FOR INCLOSING PRESERVED PROVISIONS OR FOODS OR THE LIKE.

SPECIFICATION forming part of Reissued Letters Patent No. 11,935, dated October 8, 1901.

Original No. 655,448, dated August 7, 1900. Application for reissue filed July 23, 1901. Serial No. 69,461.

*To all whom it may concern:*

Be it known that I, ARCHIBALD WHITE MACONOCHIE, merchant, a subject of the King of Great Britain and Ireland, and a resident of 131 Leadenhall street, in the city of London, England, have invented certain new and useful Improvements in or Connected with Tins for Inclosing Preserved Provisions or Foods or the Like, which invention is fully set forth in the following specification.

My invention has for its object to provide a new, expeditious, and economical way of manufacturing and closing tins for preserved provisions or goods and the like without the use of solder to close the joints and which is absolutely tightly closed.

The objections to the use of solder on account of the cost and on account of the liability to contaminating the contents of the vessel are well known. Moreover, the heat and fumes of the soldering-rooms are very injurious to the workmen employed therein. Attempts have heretofore been made to devise means for forming a suitable tight joint without the use of solder; but prior to my invention it has been found necessary for economical reasons to employ the ordinary tin with a seamed body part and heads united thereto by means of solder for many classes of preserved articles, such as cooked foods. It has been proposed to bend over the edges of such a can to form flanges and to secure the covers thereto by rolling or crimping the edge of the covers and the flanges, a sheet of paper being interposed between the cover and the body part. This plan, however, resulted in failure. When a can made in the usual way, with a longitudinal seam, is bent over at the edge to form a flange, the act of bending causes the meeting edges of the seam to separate. Owing to the weak point thus developed it has been found practically impossible to make a tight joint in this manner. Tins closed in this way have been found defective even for jams and the like and are utterly unsuitable for cooked foods, the vessels containing which must be sufficiently strong at every point to withstand steam-pressure.

By the means hereinafter described I am enabled to preserve in tins or containers perishable provisions or foods of all descriptions, including cooked foods, without the use of solder. To attain this object, the following features are essential: The body part of the can must be stamped or drawn out of a single piece of metal, with a flange projecting outward around its upper edge, the flange being seamless, continuous, and integral with the body part. The lid or cover is also formed of a single piece of metal, preferably of larger diameter than the extreme diameter of the flanged body, and between the lid and body part is interposed a disk or sheet of paper extending entirely over the under side of the lid. The paper may, if desired, be cemented or otherwise attached to the lid to facilitate handling. In closing the can the projecting edge of the lid or cover is, with the interposed paper, turned under the flange on the body part or the flanges are rolled together. This produces a perfectly tight joint capable of resisting steam-pressure, the joint being, in fact, the strongest part of the can. There is but a single joint, which is important in that where two joints are formed the making of the second joint tends to weaken or distort the first joint. It is understood that the existence of the slightest defect at any point in the can renders the entire article worthless. The means herein described have been effectively used on a very large scale and with entire success.

In carrying my invention into effect I may proceed as follows, reference being had to the accompanying drawings, whereon—

Figure 1 is a vertical section of the body of the tin. Fig. 2 is a plan, and Fig. 3 a cross-section, showing a plate of tin covered with paper for making the lid or cover. Fig. 4 is a section of the lid or cover stamped to shape. Fig. 5 shows in section the lid or cover in position ready to be pressed into place. Fig. 6 shows in section the lid or cover forced into place, and Fig. 7 shows the tin completely closed by folding one flange under the other.

The body part A, Fig. 1, I form from one piece of tin-plate, which I stamp out so as to form the bottom $a$ and sides $a^2$ of the tin, with a flange $a^3$ projecting outward around its upper edge. To make the lid or cover B, Fig. 4, I take the plate $b$ and I apply to it by means of gelatin or other suitable cementing material a sheet or sheets of paper $b^2$, as shown in Figs. 2 and 3. I then subject the combined tin-plate and paper to the action of dies, so as to stamp therefrom the lid or cover B, as shown in Fig. 4. The said lid or cover has a depressed mid-portion $c$, the periphery $c^2$ of which is inclined, so that its lower part will enter the opening at the top of the body part A of the tin, its upper part being slightly greater in diameter than the said opening. Projecting around from the upper part of the said inclined periphery is a flange $d$, of a diameter exceeding that of the flange $a^3$ on the body part A. The lid or cover is stamped so that the paper $b^2$ is situated at the under side thereof. When the food has been introduced into the tin A, the lid or cover B is put in place, as shown in Fig. 5, and is forced downward, so that the inclined periphery $c^2$ is forced into the mouth of the tin, as shown in Fig. 6, and owing to its inclination and its slightly larger diameter at its upper part it forms a very tight closure. At the same time the flange $d$ on the lid or cover is pressed and turned under the flange $a^3$ of the body part A or the flanges $d$ and $a^3$ are rolled together, the paper $b^2$ being confined thereby between the body part and lid or cover and making a perfect joint between them.

The method described of making the cover or lid is a novel and very expeditious and economical way of introducing a pliable material to make a good joint between the lid or cover and the body part, and as each part (the body part and the lid or cover) is made in one piece and the only joint is in one plane and is doubly closed, as described, a very secure tin completely protecting the contents is obtained.

Having now described the nature of my invention and the manner in which it may be performed, I declare that what I claim is—

1. A tin or container inclosing preserved goods, provisions or the like and consisting of a body part formed from one piece of tin-plate having around its upper edge a seamless flange integral with said body part, in combination with a lid or cover formed of a single piece of metal, and a sheet or disk of paper covering the entire under side of said lid or cover, the edge of the lid or cover, and the flange of the body part, together with the edge of the paper sheet being turned over or rolled together forming a single solderless joint in one plane.

2. The combination with a receptacle having a flange projecting outwardly therefrom around its upper edge or mouth, of a cover made of a metallic plate having a sheet of paper cemented to its under side and consisting of an outer flange which extends beyond the outer edge of, and is adapted to be bent around and under the flange on the receptacle, and a depressed mid-portion of frusto-conical shape, its greatest diameter at the point where it joins the flange being slightly larger than the interior diameter of the mouth or opening of the receptacle, while its smallest diameter at its lower extremity is less than said diameter of the mouth of the vessel so that it may enter the same, whereby, upon application of pressure to the cover in the act of closing the receptacle, the inclined peripheral wall of the depressed mid-portion of the closure wedges into the mouth of the receptacle causing the same to expand, and conform to the inclination of said wall, and constituting with the joint formed by bending the flange on the cover about and under that on the receptacle, a tight and secure closure for the receptacle.

3. The combination with a receptacle having a flange projecting outwardly therefrom around its upper edge or mouth, said receptacle and flange being formed integrally from a single piece of sheet metal, of a cover made in one piece from a sheet-metal plate having a sheet of paper cemented to its under side and consisting of an outer flange which extends beyond the outer edge of, and is adapted to be bent around and under the flange on the receptacle, and a depressed mid-portion of frusto-conical shape, its greatest diameter at the point where it joins the flange being slightly larger than the interior diameter of the mouth or opening of the receptacle, while its smallest diameter at its lower extremity is less than said diameter of the mouth of the vessel so that it may enter the same, whereby, upon application of pressure to the cover in the act of closing the receptacle, the inclined peripheral wall of the depressed mid-portion of the closure wedges into the mouth of the receptacle causing the same to expand and conform to the inclination of said wall, and constituting, with the joint formed by bending the flange on the cover about and under that on the receptacle, a tight and secure closure for the receptacle.

In testimony whereof I have signed this specification in the presence of two subscribing witnesses.

ARCHIBALD WHITE MACONOCHIE.

Witnesses:
PHILIP MAURO,
EDWARD CHARLES HAMMOND.